United States Patent
Smailagic et al.

[11] Patent Number: 5,959,611
[45] Date of Patent: Sep. 28, 1999

[54] PORTABLE COMPUTER SYSTEM WITH ERGONOMIC INPUT DEVICE

[75] Inventors: Asim Smailagic; John Michael Stivoric; Daniel Paul Siewiorek; Drew Anderson, all of Pittsburgh, Pa.

[73] Assignee: Carnegie Mellon University, Pittsburgh, Pa.

[21] Appl. No.: 08/960,541

[22] Filed: Oct. 31, 1997

Related U.S. Application Data

[63] Continuation of application No. 08/399,203, Mar. 6, 1995, abandoned.

[51] Int. Cl.$^6$ .................................................. G09G 5/00
[52] U.S. Cl. ........................... 345/156; 345/157; 345/167; 341/22; 364/708.1
[58] Field of Search ..................................... 345/156, 157, 345/163, 166, 167, 169, 184, 905; 364/708.1, 709.11; 248/917; D14/106, 114; 341/20–22; 340/825.19

[56] References Cited

U.S. PATENT DOCUMENTS

| | | | |
|---|---|---|---|
| 4,561,049 | 12/1985 | Deleganes et al. | 345/184 |
| 5,095,303 | 3/1992 | Clark et al. | 345/164 |
| 5,105,338 | 4/1992 | Held | D14/106 |
| 5,305,244 | 4/1994 | Newman et al. | 364/708.1 |
| 5,305,449 | 4/1994 | Ulenas | 345/163 |
| 5,438,530 | 8/1995 | Bettini | 364/708.1 |
| 5,459,462 | 10/1995 | Venkidu et al. | 341/22 |
| 5,477,508 | 12/1995 | Will | 368/189 |
| 5,521,617 | 5/1996 | Imai et al. | 345/167 |
| 5,589,893 | 12/1996 | Gaughan et al. | 345/167 |
| 5,627,531 | 5/1997 | Posso et al. | 341/22 |

OTHER PUBLICATIONS

"Rotating Icon Selector" IBM Technical Disclousure vol. 37, No. 07, Jul. 1994, p. 59.
Anthony Ralston "Encyclopedia of Computer Science" 1995 pp. 182.

*Primary Examiner*—Amare Mengistu
*Attorney, Agent, or Firm*—Kirkpatrick & Lockhart LLP

[57] ABSTRACT

A portable computer system with an ergonomic input device is comprised of a housing having a top surface. A central processing unit is carried in the housing. A heads-up display is provided for displaying information to a user, with certain of the information being selectable by the user. The display is under the control of the central processing unit. A first rotary switch produces a first input signal for identifying the information to be selected. A second input switch produces a second input signal for selecting the identified information. Both the first and second input switches are carried on the top surface of the housing. An input interface receives the first and second input signals and encodes the information therein into an eight bit byte for input to the central processing unit. In one embodiment, the housing may be carried in a case which is worn by the user while the heads-up display is positioned proximate to the user's eye by a headband.

24 Claims, 6 Drawing Sheets

PORTABLE COMPUTER SYSTEM WITH ERGONOMIC INPUT DEVICE

This application is a continuation of application Ser. No. 08/399,203 filed on Mar. 6. 1995, now abandoned.

BACKGROUND OF THE INVENTION

1. Field of the Invention

The present invention relates generally to computers and input devices, and more specifically to a portable computer system having an ergonomic input device.

2. Description of the Invention Background

The convergence of a variety of technologies is preparing the next paradigm shift in information processing for the 1990s. Continued advances in semiconductor technology are producing high performance microprocessors requiring less power and less space. Decades of research in computer science have provided the technology for hands-off computing using speech and gesturing for input. Miniature heads-up displays weighing less than a few ounces combined with mobile communication technology make it possible for users to access information anywhere. It is even possible to sense a user's position such that the information can be superimposed upon the user's workspace.

Currently, wearable and other types of portable computers are all hampered by the need for the user to be able to input information or commands in an ergonomic and convenient manner. The use of a full size keyboard cancels many of the benefits gained by having a small portable or wearable computer. The provision of a keyboard also assumes that the user of the computer, perhaps a maintenance worker, will be capable of using the keyboard in an efficient manner. A mouse input device overcomes the problems associated with a keyboard, but the use of a mouse becomes impractical in confined areas where there is no flat surface on which to operate the device. Track balls alleviate that problem, but many people find such devices difficult to operate. Furthermore, the delicate mechanism of a track ball would quickly become inoperative in a manufacturing or maintenance environment where workers' hands are often heavily soiled. Voice input is hampered by the difficulties inherent in enabling computers to understand the spoken word. Thus the need exists for a rugged, ergonomic, inexpensive, input device that can be used with a portable computer system to allow the full benefits of the portable computer system to be realized.

SUMMARY OF THE PRESENT INVENTION

The present invention is directed to a portable computer system with an ergonomic input device that is rugged, easy to use, and inexpensive. The computer system is comprised of a housing having a top surface. A central processing unit is carried in the housing. A heads-up display is provided for displaying information to a user, with certain of the information being selectable by the user. The display is under the control of the central processing unit. A first rotary switch produces a first input signal for identifying the information to be selected. A second input switch produces a second input signal for selecting the identified information. Both the first and second input switches are carried on the top surface of the housing. An input interface receives the first and second input signals and inputs the information contained in those signals to the central processing unit.

In one embodiment, the housing may be carried in a case which is worn by the user while the heads-up display is positioned proximate to the user's eye by a headband. The present invention thus provides a wearable computer with hands-off access to text, images, maps, and other information needed to provide various operations and services. The ergonomic input device is easy to learn and operates in an intuitive manner. The computer system may be used as a maintenance assistant and advisor. The computer system may be implemented using low cost components in a design which minimizes power consumption. Those and other advantages and benefits of the present invention will become apparent from the Description Of A Preferred Embodiment hereinbelow.

BRIEF DESCRIPTION OF THE DRAWINGS

For the present invention to be readily understood and practiced, preferred embodiments will be described in conjunction with the following figures wherein.

DESCRIPTION OF A PREFERRED EMBODIMENT

Figure 1:
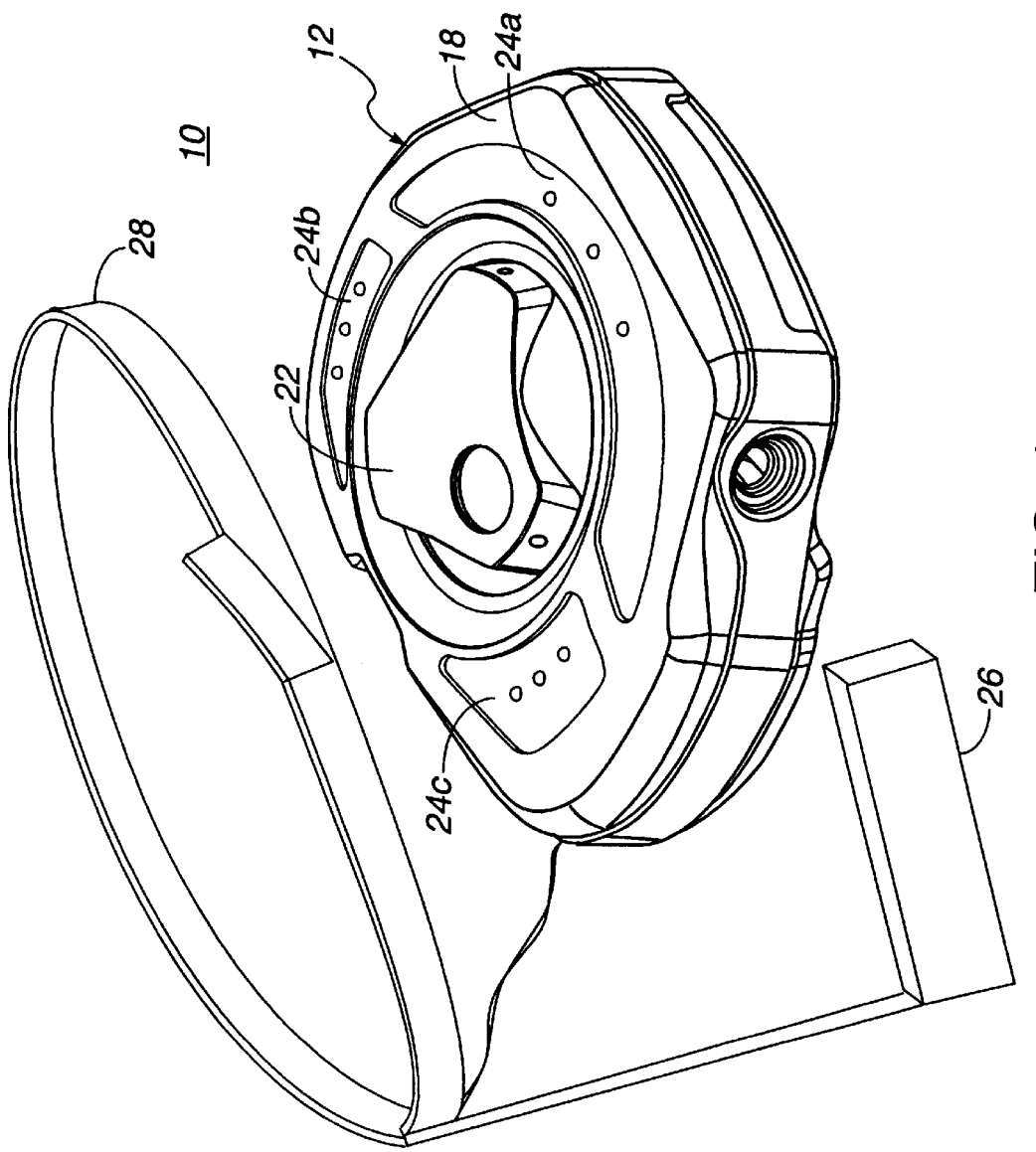
FIG. 1 is a perspective view of a portable computer system with an ergonomic input device constructed according to the teachings of the present invention.
Figure 2:
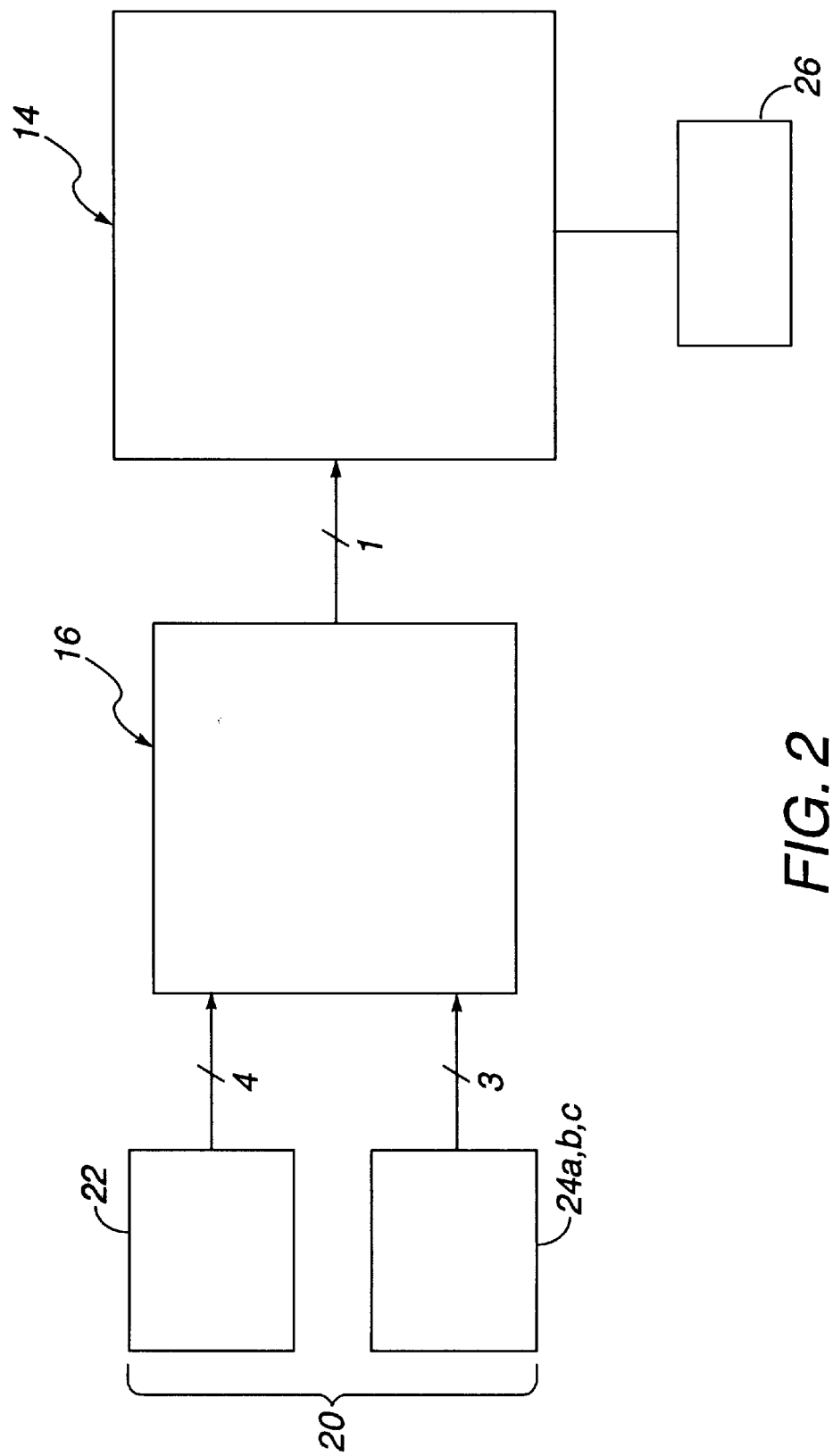
FIG. 2 is a high level block diagram of the electronics of the portable computer system shown in FIG. 1.
Figure 6:
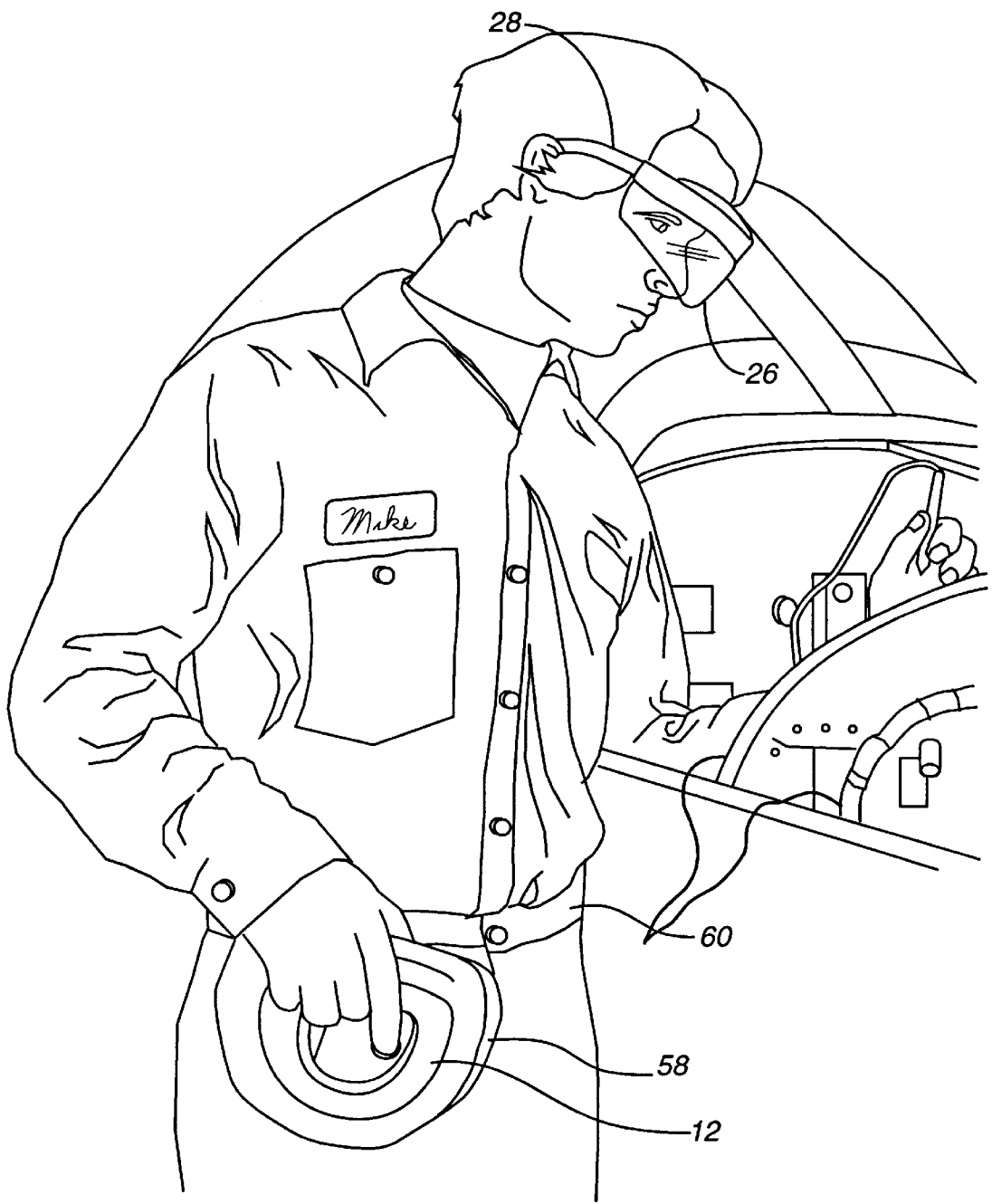
FIG. 6 illustrates the computer system of the present invention in use in a maintenance setting.

A portable computer system with an ergonomic input device constructed according to the teachings of the present invention is illustrated in a prospective view in FIG. 1 and as a block diagram in FIG. 2. The computer system 10 is comprised of a housing 12 which carries a central processing unit (CPU) 14 and an input interface 16. The housing 12 also has a top surface 18 which carries an ergonomic input device 20. The ergonomic input device 20 is comprised of a rotary switch or dial 22 and on/off switches 24a, 24b, and 24c. The computer system 10 is additionally comprised of a heads-up display 26 of a known type. The display is under the control of the CPU 14 and may be carried by a belt or headband 28 which may be an adjustable type of headband worn by the user so that display 26 may be positioned proximate to the user's eye. (See FIG. 6)

The rotary switch 22 may be a 16 position, binary coded, rotary switch, which outputs a four-digit gray code representing the switch's position. A gray code is a special binary encoding scheme where adjacent numbers or positions have codes that differ in only one bit position. That prevents invalid readings should the position of the rotary switch 22 be sampled during a transition. The switches 24a, 24b, 24c may be momentary pushbutton switches positioned so as to surround the rotary switch 22.

Figure 3:
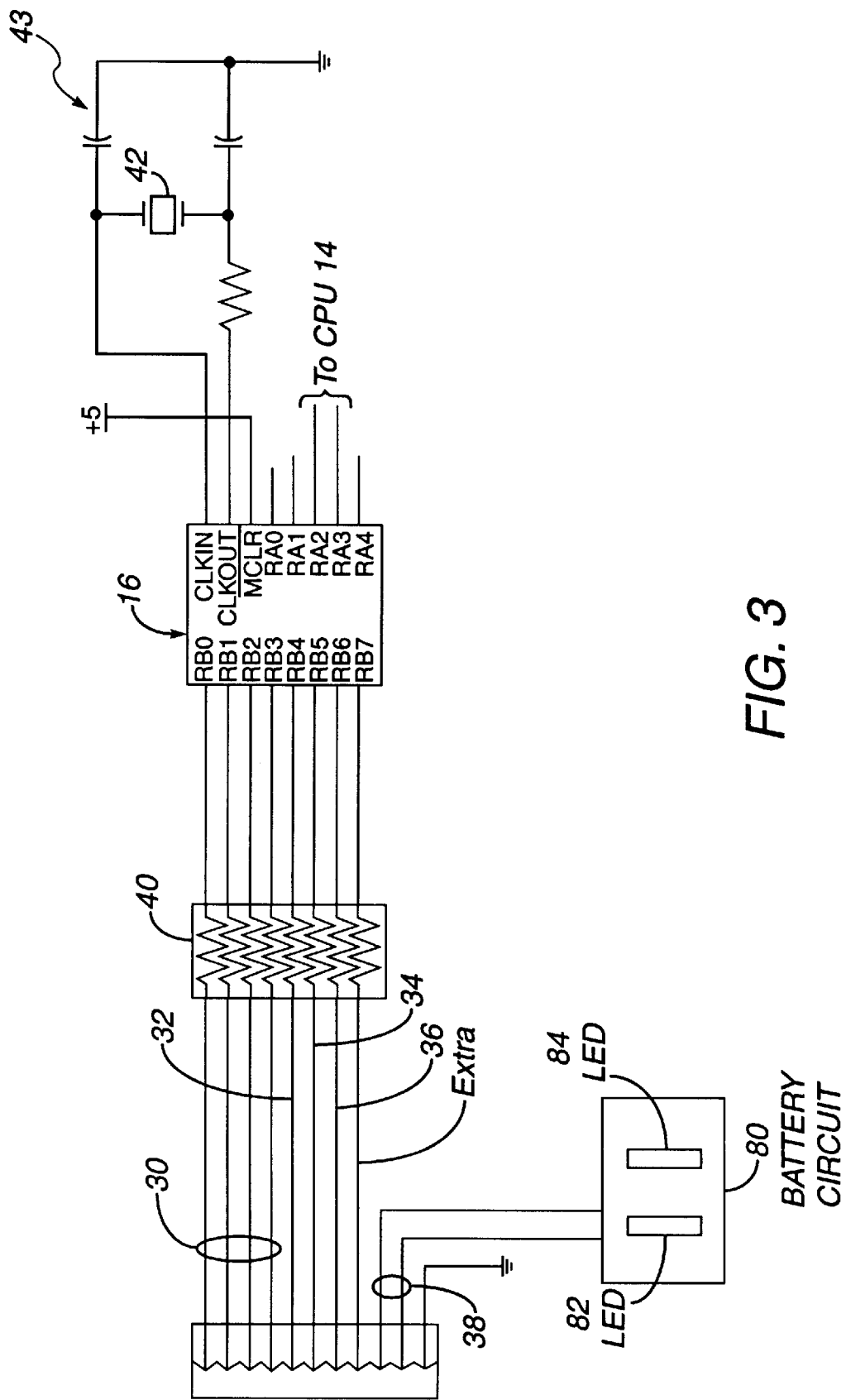
FIG. 3 is an electrical schematic of the input interface of the block diagram of FIG. 2.

Turning to FIG. 3, an electrical schematic of the input interface 16 is illustrated. The input interface translates the movement of the rotary switch 22 and the depressions of the switches 24a, 24b, 24c into data in a form that the CPU 14 can accept. In FIG. 3, four conductors 30 carry a first input signal produced by the rotary switch 22. The first input signal preferable sequentially identifies the information on the screen that is selectable. Conductors 32, 34, and 36 carry signals produced by switches 24a, 24b, and 24c, respectively, which signals are used to select an identified piece of information. A pair of conductors 38 may be connected to a circuit 80 of known construction which indicates battery life. A green LED 82 is lit when battery voltage is acceptable and a red LED 84 flashes when battery voltage is low.

The group of conductors 30, and the individual conductors 32, 34, and 36 are input through a resistive bank 40 into input interface 16. The input interface 16 may be implemented using a PIC16LC71 microcontroller from Microchip Technology, Inc. Such a microcontroller may be programmed to accept the first and second input signals and encode the information contained therein into, for example, an eight bit byte of the type described hereinbelow. The eight bit byte contains the user input which is then transmitted to the CPU 14 through a serial port.

The PIC microcontroller was chosen for a number of reasons. First, one of the important characteristics of the computer system 10 is power consumption. The PIC microcontroller has a sleep mode. That mode halts the oscillator and puts the microcontroller in a special low-power mode which draws less than one micro-amp of current. The built-in watchdog timer can be preprogrammed to wake the PIC microcontroller from the sleep mode after a predetermined amount of time. The PIC microcontroller is the only part of the system that is connected to power, because the pull-up resistors (not shown) for the rotary switch 22 and push-button switches 24a, 24b, and 24c are contained within the PIC microcontroller, and can be turned on and off at will. Because the PIC microcontroller is programmed to spend most of its time sleeping, there is very low power consumption.

Second, the PIC microcontroller contains most of the necessary circuitry on board. The only electrical components necessary, aside from the microcontroller, are the rotary switch 22, push-button switches 24a, 24b, 24c, the resistor bank 40, a 2.0 MHz crystal 42 and associated components needed to form an oscillator 43. As a result, the ergonomic input device 20 and input interface 16 is very small, which is of great importance in the field of portable or wearable computers.

User input may be transmitted to the CPU 14 as one byte for every switch 24a, 24b, 24c depression or every turn of rotary switch 22. The data byte consists of six significant bits. Bits 5 and 6 represent the rotary switch turning clockwise and counterclockwise, respectively. If one of those bits is set to one, then the bits 0 through 4 represent the gray code input signal. If both of those bits are set to zero, then bits 0 through 4 represent four possible switches (of which only three are currently used). If any of bits 0 through 4 is set to 1, then the corresponding switch was just depressed. It is possible for more than one bit to be set in a data byte, if a user presses two switches at the same time, for example. However, a byte is transmitted only when a switch is depressed or the dial is turned. That allows the software to set an interrupt on the serial port to which the PIC microcontroller is connected, and use the interrupt handler to monitor user input.

Currently, the PIC microcontroller runs at 2.0 MHz, and transmits data at 9600 baud. All of that is, of course, programmable as are the transmission codes and events causing a transmission. For example, the interface 16 could be programmed to transmit keyboard scan codes or ASCII characters. Codes can be transmitted when switches are released as well as pressed, or based on the rotary switch's current position instead of its movement. The input connector has provision for eight input lines. That could be used for one 16-position dial and four button switches, two dials and eight button switches, or some combination of dials, buttons, and other devices, simply by reprogramming the PIC microcontroller.

Figure 4:
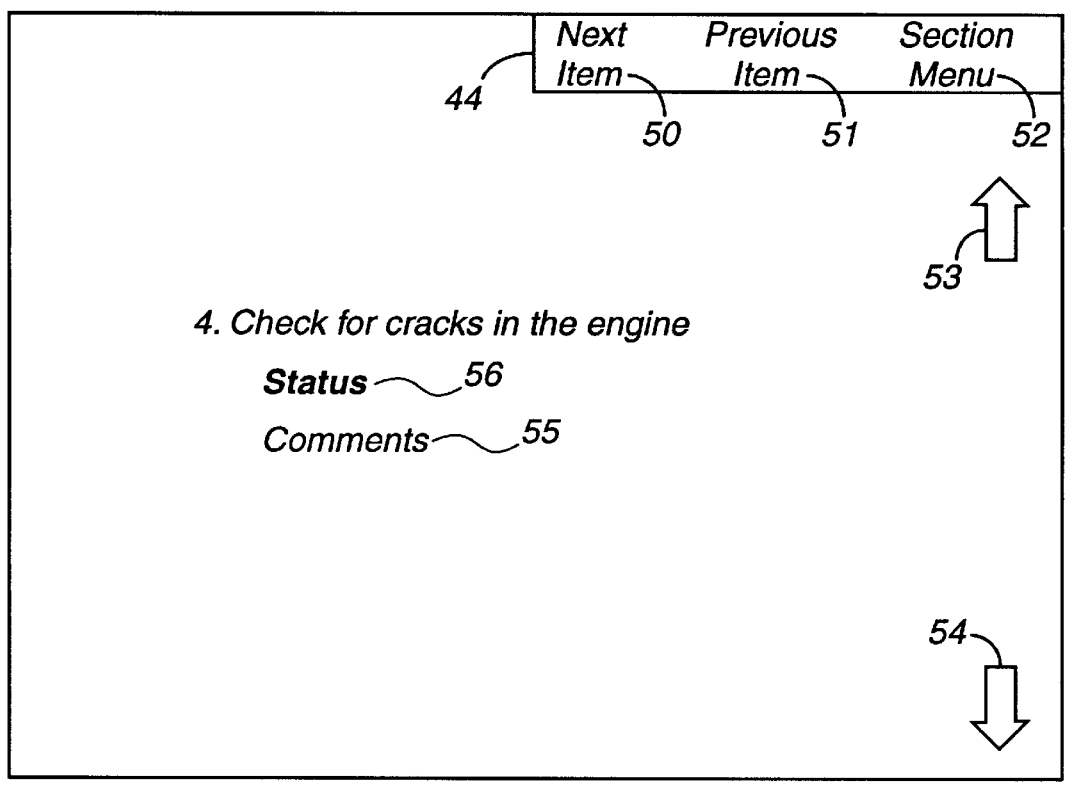
FIG. 4 illustrates a sample screen.

In FIG. 4, a sample screen is illustrated which may be visible in display 26. The screen illustrates a command window 44 which has options identified as "Next Item" 50, "Previous Item" 51, and "Section Menu" 52. The screen also displays text, with two options possible under the text identified as "Status" 56 and "Comments" 55. Two arrows are also illustrated on the screen identified as 53 and 54 to enable the user to scroll up or down, respectively. As is known, a particular portion of the screen can be selected to perform an action. Such zones are recognizable by their boldness, as shown by the word "Status" 56, or by a blinking cursor. Such zones are referred to as hot spots. The user can move through the hot spots 50, 51, 52, 53, 54, 55, and 56 by rotating the rotary switch 22 in a clockwise direction. Rotation of the rotary switch 22 in a counterclockwise position causes the user to move through the hot spots in a reverse order. When the desired hot spot is identified as shown in bold, any one of the switches 24a, 24b, 24c may be depressed to select the identified hot spot.

Figure 5:
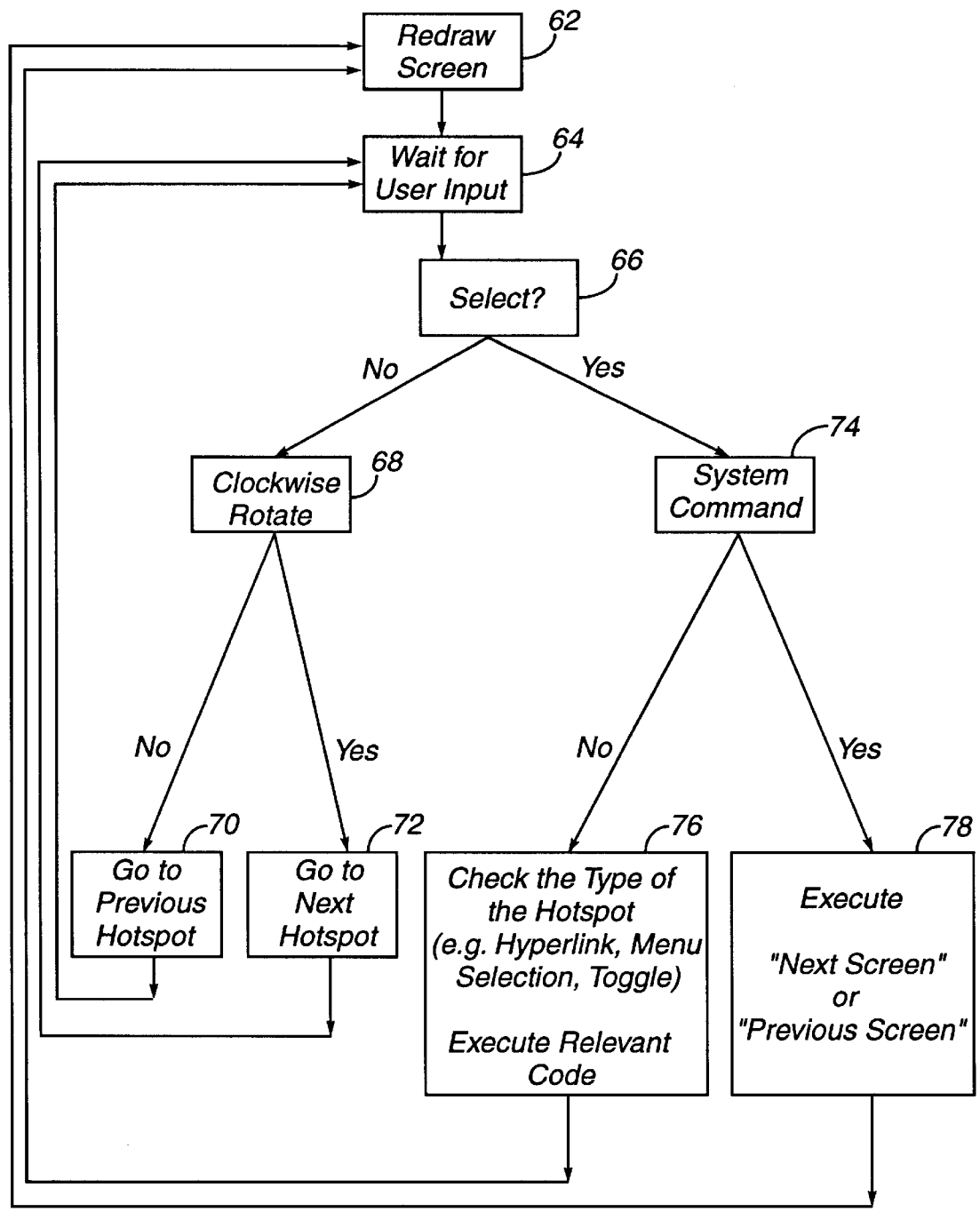
FIG. 5 is a flow chart illustrating the relationship between the operation of the ergonomic input device of the present invention and the position of a hot spot on a display.

A block diagram illustrating the operation of the software which controls the interaction between the ergonomic input device 20 and the control of the hot spot on the display 26 is illustrated in FIG. 5. In FIG. 5, a screen is drawn or redrawn at step 62. Thereafter, process control proceeds to step 64 in which the software awaits input from the user, i.e., the eight bit byte of information provided to the CPU 14 from the input interface 16. When input is received from the user, step 66 determines if a selection has been made, i.e. whether one of the switches 24a, 24b, 24c has been depressed. If none of the switches has been depressed, then the input must be rotation of the rotary switch 22 and process control proceeds with step 68. At step 68, a determination is made if the switch 22 has been rotated clockwise. If so, process control proceeds with step 72 wherein the next hot spot becomes the active hot spot. If the rotary switch has been rotated counterclockwise, process control proceeds with step 70 in which the previous hot spot becomes the current hot spot. After either step 70 or 72, process control returns to step 64 to await additional user input.

If at the select step 66 a selection was made, process control proceeds with step 74 to determine if a system command had been invoked. If not, the type of hot spot is checked at step 76, the relevant code is executed, and the screen is redrawn at step 62. If, on the other hand, a system command is invoked at step 74, at step 78 an execution of the next screen or previous screen, as appropriate, is performed and the appropriate screen is redrawn at step 62. Thereafter, process control returns to step 64 to await additional user input. In that manner, the rotation of the rotary switch 22 coupled with operation of the push-button switches 24a, 24b, 24c controls the hot spot and ultimately controls the information displayed on the display 26. Those of ordinary skill in the art will recognize that the flow chart illustrated in FIG. 5 can be implemented in software in a variety of ways.

We have found that the rotary switch 22 is a very convenient input device for a range of applications such as where the user is wearing gloves, performing maintenance or manufacturing in a confined environment, in areas with dirt, fuel, corrosive chemicals, etc.

Although the input device 20 of the present invention may be used to control the hot spot with any type of document displayed on the display 26, use of rotary switch 22 and push-button switches 24a, 24b, and 24c is particularly advantageous for browsing through a hypertext document. The hypertext links may be specified by the hypertext document author. Whenever the user selects a hypertext link, which is represented as a hot spot, the relevant hypertext page will be shown on the screen. The computer system 10 of the present invention can provide an extremely large volume of information to the user such that it becomes a tool in the user's environment much like pencils or reference books. The computer system 10 can provide automatic, portable, convenient access to extremely large volumes of information. As a result, the following applications are envisioned.

Self-guiding navigation—Through position sensing the computer system 10 can help a user maneuver in a strange location by superimposing information on a see-through display precisely in the direction the user is looking at the moment of inquiry.

See-through reality for manufacturing—Construction engineers for such diverse industries as aircraft, buildings, chemical plants, and shipbuilding have large, oversized blueprints that frequently have to be referenced during the construction process. The computer system 10 would allow this information to be carried by the construction worker to the point of application, thereby increasing efficiency and decreasing errors.

Maintenance—As systems become more reliable and more complex, maintenance and repair become increasingly challenging problems. The computer system 10 superimposes maintenance information upon the actual artifact, can use highlighting and animation to identify components, and the procedures necessary to replace them.

Medical—Large medical databases are still centrally located making access to information time-consuming. The computer system 10 would allow a physician to call up multi-media information ranging from textual diagnosis and graphs of vital signs, to x-rays while treating the patient.

Returning to FIG. 1, the housing 12 may be designed to withstand shock, temperature, water, and dirt. A link may be provided between the CPU 14 and a main computer (not shown) so that results from inspection checklists, manufacturing checklists, etc. can be uploaded for scheduling and planning. The CPU 14 may be used in conjunction with another board controlling memory cards or other devices such as a transmitter/receiver in a modular fashion. By providing a carrying case 58 of the type shown in FIG. 6, together with a belt 60, the computer system 10 can be conveniently used in maintenance, manufacturing, and other settings.

The present invention thus provides a wearable computer with hands-off access to text, images, maps, and other information needed to provide various operations and services. The ergonomic input device 20 is easy to learn and operate in an intuitive manner. As a maintenance assistant and advisor, the computer system 10 of the present invention can provide:

help in determining equipment status accurately and rapidly;

easily accessible and extensive expert information for on-the-job support;

job aid to insure accuracy and diminished need for extensive training; and status information to a fast automated system for problem sorting and generating work orders.

Although the present invention has been described in conjunction with preferred embodiments thereof, it is expected that many modifications and variations will be developed. This disclosure and the following claims are intended to cover all such modifications and variations.

What is claimed is:

1. A portable computer system with an ergonomic input device, comprising:

a housing having a surface;

a processing unit carried in said housing;

a two-dimensional heads-up display for displaying information to a user, certain of the information being selectable by the user, said display being under the control of said processing unit;

a first input rotary switch centered in said housing and having a single degree of freedom for producing a first signal for identifying the information to be selected, in a predetermined sequence, without moving all of said information being selectable by the user;

a second input switch at a periphery of said first switch for producing a second signal for selecting the identified information, said first and second input switches carried on said surface of said housing; and an input interface for receiving said first and second signals and for inputting the information contained in said first and second signals to said processing unit, said first signal being mapped to a position on said display.

2. The computer system of claim 1 wherein said first input rotary switch includes a rotary switch for producing a first signal that is a gray code signal.

3. The computer system of claim 2 wherein said second input switch includes a plurality of pushbutton switches each producing a second signal for selecting the identified information.

4. The computer system of claim 1 wherein said display includes a headband carrying said display such that the display my be positioned proximate to a user's eye.

5. The computer system of claim 4 additionally comprising a case for carrying said housing and a belt connected to said case so that the housing may be worn by the user.

6. The computer system of claim 1 wherein said interface includes a microcontroller for receiving said input signals and for producing an eight bit byte having the information from said input signals coded therein.

7. A portable computer system having an ergonomic input device, comprising:

a housing having a surface;

a central processing unit carried in said housing;

a two dimensional heads-up display for displaying information to a user, certain of the information being selectable by the user, said display being under the control of said central processing unit;

a first input rotary switch centered in said housing and having a single degree of freedom for producing a first signal;

a second input switch at a periphery of said first switch for producing a second signal, said first and second input switches being carried on said surface of said housing; and a software routine running on said central processing unit, said routine for receiving said first and second signals and for mapping said first signal to one of a number of positions on said display, in a predetermined sequence, without moving all of said information being selectable by the user, and for selecting certain information in response to said second signal.

8. The computer system of claim 7 wherein said rotary switch is sized to be easily rotated.

9. The computer system of claim 8 wherein said rotary switch is triangularly shaped and has an indentation in one point of the triangle.

10. The computer system of claim 8 wherein said rotary switch has a plurality of discrete positions.

11. The computer system of claim 7 wherein said second signal causes said central processing unit to perform a function that is related to the displayed information.

12. A computer system, comprising:

a housing having a surface;

a central processing unit carried in said housing;

a two-dimensional heads-up display under the control of said central processing unit, said display for displaying a plurality of information items in a predetermined order;

a first input rotary switch centered in said housing and having a single degree of freedom for producing a first signal;

a second input switch at a periphery of said first switch for producing a second signal, said first and second switches being carried on said surface of said housing; and means executed on said central processing unit for cycling through said predetermined order of information items in a first direction, without moving all of said information items, in response to rotation of said rotary switch in a first direction and for cycling through said predetermined order of information items in an opposite direction, without moving all of said information items, in response to rotation of said rotary switch in a direction opposite to said first direction, and for selecting an information item in response to said second signal.

13. The computer system of claim 12 wherein said rotary switch is sized to be easily rotated.

14. The computer system of claim 13 wherein said rotary switch is triangularly shaped and has an indentation in one point of the triangle.

15. The computer system of claim 13 wherein said rotary switch has a plurality of discrete positions.

16. The computer system of claim 12 wherein said second signal causes said central processing unit to perform a function that is related to the displayed information.

17. A combination, comprising:

a heads-up display having at least two dimensions;

a rotary input device centered in said housing and having a single degree of freedom;

a second input at a periphery of said first input;

a processor, connected to said display and said first and second input devices, for selecting, in a predetermined sequence, among a plurality of predetermined regions of said display, without moving all of said predetermined regions of said display, and in response to said rotary input device.

18. The combination of claim 17 wherein said rotary input device has a plurality of discrete positions.

19. The combination of claim 18 wherein said processor selects among said plurality of predetermined regions in a predetermined sequence responsive to rotation of said rotational input device.

20. The combination of claim 19 wherein said processor selects the next sequential said predetermined region in response to movement of said rotational input device between said adjacent discrete positions.

21. The combination of claim 17 wherein said rotational input device is triangular in shape.

22. The computer of claim 21 wherein said triangular input device has an indentation on its top surface.

23. A method of mapping a one dimensional signal to a two dimensional heads-up display, comprising the steps of:

establishing a sequence of hot spots on the heads-up display;

moving, in a predetermined order, through said sequence of hot spots in one of first and second directions, without moving all of said hot spots, in response to first input signal, the amount of movement being proportional to the displacement of a rotary switch; and selecting a hot spot in response to a second input signal from a switch at a periphery of the rotary switch.

24. The method of claim 23, wherein rotation of said rotary switch in a clockwise direction causes activation of said hot spots in the first direction and wherein rotation of said rotary switch in a counter clockwise direction causes activation of said hot spots in a second direction opposite to said first direction.

* * * * *